United States Patent [19]

Moreland

[11] Patent Number: 5,412,807
[45] Date of Patent: May 2, 1995

[54] SYSTEM AND METHOD FOR TEXT SEARCHING USING AN N-ARY SEARCH TREE

[75] Inventor: Bruce Moreland, Redmond, Wash.

[73] Assignee: Microsoft Corporation, Redmond, Wash.

[21] Appl. No.: 932,758

[22] Filed: Aug. 20, 1992

[51] Int. Cl.$^6$ ............................................. G06F 15/40
[52] U.S. Cl. ............................. 395/600; 364/419.13; 364/419.19; 364/DIG. 1; 364/283.1
[58] Field of Search ................... 395/600; 364/419.13, 364/419.19

[56] References Cited

U.S. PATENT DOCUMENTS

| | | | |
|---|---|---|---|
| 4,468,728 | 8/1984 | Wang | 395/600 |
| 4,611,298 | 9/1986 | Schuldt | 395/600 |
| 5,175,814 | 12/1992 | Anick et al. | 395/161 |
| 5,201,048 | 4/1993 | Coulter et al. | 395/600 |
| 5,257,365 | 10/1993 | Powers et al. | 395/600 |

OTHER PUBLICATIONS

Cormen, T., "Intro to Algorithms", 1990 pp. 384–388.

*Primary Examiner*—Thomas G. Black
*Assistant Examiner*—John C. Loomis
*Attorney, Agent, or Firm*—Seed and Berry

[57] ABSTRACT

A system and method for searching a text file for the occurrence of user-selected text portions that satisfy user-specified conditions. The user-specified conditions are in the form of logical operator terms that interrelate user-selected word terms. The system uses a full text index describing the location of all word terms within a text file. The system accepts the user-selected word terms and the user-specified conditions and constructs an n-ary search tree where terminal nodes represent the user-selected text portions and the non-terminal nodes represent logical operator terms that interrelate the word terms. The system uses the full text index to construct index lists for each of the word terms and has an index pointer for each of the index lists. A Boolean evaluator analyzes each of the non-terminal nodes to determine if word terms represented by adjacent terminal nodes satisfies the logical operation term represented by the non-terminal nodes. The system determines which of the index pointers will be incremented by analyzing the location within the text file of the current occurrences of the words represented by terminal nodes and the next occurrences within the text file of the words represented by terminal nodes. Positive results of the non-terminal node analysis are temporarily saved and passed up the tree to the adjacent non-terminal node. When analysis of a non-terminal node is complete, the system will discard any index lists that have already been used in the completed non-terminal node analysis. The system and method require only a single pass through the full text index and do not require the use of intermediate files as are typical of a binary search tree. The system is easily implemented on a microcomputer with limited memory.

33 Claims, 3 Drawing Sheets

SYSTEM AND METHOD FOR TEXT SEARCHING USING AN N-ARY SEARCH TREE

TECHNICAL FIELD

The present invention relates to a system and method for text searching. More specifically, the present invention relates to a system and method for searching text using an n-ary Boolean search tree.

BACKGROUND OF THE INVENTION

Computer systems are highly useful for compiling and processing large amounts of data. With the increase of storage capacity in modern microcomputers, it is possible to store large databases within a microcomputer system in a home or office environment. The introduction of laser discs for storing vast amounts of data have made it possible for a microcomputer to access databases including encyclopedias, textbooks or the like.

As more information is added to the microcomputer system, it is increasingly important to have efficient techniques for locating desired information. Many systems of the prior art use search techniques to locate user-specified text. The user enters the desired search request in a manner specified by the application program. Frequently, a search string will involve more than one word term and may be accompanied by logical expressions relating the word terms. For example, a user may wish to search an encyclopedia for a document containing information about computer memory devices, but does not want information about read-only memories (ROM). The search string may appear as "computer AND memory NOT ROM." Of course, many different formats of search strings may be used by different application programs, and the search string above is provided only as one example of the many possible search strings. For the sake of simplicity, word terms are referred to throughout this document by the letters A, B, C, D, etc. It is obvious to those skilled in the art that the word terms represented by these letters may be any user-selected words.

Computer text searchers must evaluate both the word terms selected by the user and the user-specified conditions that interrelate the word terms. In the example above, a text file must contain the word terms "computers" and "memory" and must not contain the word term "ROM". Thus, there are word terms that must be detected and logical terms interrelating the word terms that must be satisfied. Typical examples of logical terms that define the interrelationships of word terms include AND, OR, NOT, PHRASE, and NEAR. The AND term is an exclusive logical operator and will detect only word terms that include all of the specified elements. For example, A AND B AND C will only detect the occurrence of all three word terms A, B, and C. It will not detect occurrences of only A and B nor will it detect A and C. The OR term is in inclusive logical operator and will detect any word terms interrelated by the logical OR operator. For example, A OR B OR C will detect all occurrences in a text file of either A, B, or C. The NOT logical operator is also an exclusion operator and will not detect any occurrences in which the specified word term is included. For example, NOT A instructs the text searcher not to include any text file in which the term A appears. The PHRASE logical operator is similar to the AND logical operator except that it relates to sequences of multiple word terms which must appear in the specified sequence and must occur one word term apart. For example, PHRASE ABC will only detect the occurrence of the three consecutive word terms ABC and will not detect AB or ABDC or CBA. The NEAR logical operator relates word terms and the location within the text file. For example, A NEAR5 B will detect all occurrences of the word term A within five word terms of B. Similarly, A OR B NEAR10 C will detect all occurrences of either A or B that occur within ten word terms of C. Wild card designators, such as "*," are often used in combination with characters to provide a broad search. For example, a search for the text string "bake*" will locate any words that begin with "bake," such as baked, baker, bakery, etc.

Often, text searchers use a binary search tree to evaluate logical operators one at a time. Each time a logical operator is evaluated, an intermediate list is created to store the results of the binary search. The text file must be examined again to evaluate the next logical operator and another intermediate list is created. Finally, the various intermediate lists are evaluated to determine the final result of the search. For example, the search string A AND B AND C using a binary search tree requires a search of the text file for the logical operator term A AND B. The results are stored in an intermediate file, which for the sake of convenience will be called X. Thus, X=A and B. The text file must be searched a second time for the logical operator term X AND C. This search system requires multiple passes through the text file and also requires the storage of intermediate lists which may occupy large amounts of memory space.

Binary search trees often encounter problems in situations that require simultaneous evaluation of multiple word terms. For example, the search string A NEAR3 B NEAR3 C cannot be simultaneously evaluated by a binary search tree. Instead, the approach taken by a binary search tree is to evaluate A NEAR3 B and store the results, which we shall call X, in an intermediate file. In a second pass, the binary search tree evaluates X NEAR3 C. A sample list of occurrences may include A at location 1, B at location 3 and C at location 5. The binary search tree first evaluates A NEAR3 B and produces location 1 as a result of the search. In the second pass of the binary search tree, X NEAR3 C will detect no occurrences since location 1 is not within 3 word terms of location 5, even though B is within 3 word terms of C. Prior art systems go to great lengths to avoid this type of problem, but the result is a complex search routine with slow execution times and even greater memory requirements.

Many of these prior art systems are inefficient because they require several passes through the entire text file to locate the user-selected text which satisfies the user-specified conditions. Other techniques used by databases on large computer systems are not appropriate in a microcomputer environment because of the requirements for large amounts of memory. Therefore, it can be appreciated that there is a significant need for a system and method for simultaneously evaluating Boolean operators in a microcomputer environment.

SUMMARY OF THE INVENTION

In the preferred embodiment of the invention, the inventive system is implemented by a computer containing a full text index indicating the location of all words within a text file, and a logic unit which accepts user-selected text portions and user-specified conditions interrelating the user-selected text portions. The logic unit constructs an n-ary Boolean search tree with a root node representing the results of a text search where terminal nodes contain word terms representing the various user-selected portions and the non-terminal nodes contain logical operator terms representing the user-specified conditions that interrelate the word terms. Alternatively, the system defines word terms and the logical interrelation of word terms without the use of an n-ary search tree to interrelate the word terms and logical operator terms.

The system includes index lists, each showing the location within the text file of all occurrences of a word term for each of the terminal nodes. An index pointer for each index list points to the current position within the index list. The index pointer is initially set to point to the first occurrence of each of the word terms within the text file. A Boolean pointer selects a non-terminal node for analysis with the Boolean pointer initially selecting the non-terminal node furthest from the root node for analysis. A Boolean evaluator applies the logical operator for the selected non-terminal node to the related word terms and generates a hit signal if the current word term locations indicated by the index lists satisfy the logical operator.

An index list is created indicating locations within the text file where the word terms satisfy the conditions of the logical operator. An index counter advances the index pointer for the index list whose present occurrence indicated by the index lists is at the location within the text file closest to the end of the text file from which the search began if no hit signal is generated by the Boolean evaluator or if the logical operator is an OR operator. If a hit signal is generated, the system advances the index pointer for the index list whose next occurrence of the word term is at the location within the text file closest to the end of the text file from which the search began.

The system also includes means for advancing the Boolean pointer to analyze additional non-terminal nodes. If the non-terminal node requires that other non-terminal nodes further from the root node be analyzed first, the Boolean pointer selects the non-terminal node further from the root node. In one embodiment, the system discards any index that is already evaluated by the Boolean evaluator. The inventive system and method is easily incorporated into a microcomputer.

DETAILED DESCRIPTION OF THE INVENTION

As described above, a text search typically consists of text portions or word terms selected by the user and user-specified conditions or logical operator terms that interrelate the word terms. A text portion, which may be a single character, a group of characters, a word term, or a group of words, will be referred to as a text portion or a word term. A search which satisfies both the user-selected word terms and the user-specified logical operator terms is commonly called a "hit." The system of the present invention will record all hits and provide the user with a list of hits in the document or documents specified by the user. In the example given above of "computer AND memory NOT ROM," a hit would occur any time the words "computer" and "memory" appear in an article, but only if the word ROM does not also appear in the same article. The location of all hits is stored in a list provided to the user.

There are a variety of techniques used to enter the user-selected word terms and user-specified logical operator terms interrelating the user-elected word terms. For example, a keyboard on a microcomputer is the most common method of entering the search request data. However, computer pens may also be used to enter data. Some computer systems may have voice recognition capability and can interpret the user's voice as a way of data entry. The present invention is capable of searching text for any of the above-described methods of data entry.

The inventive method simultaneously evaluates like logical operator terms without the complexities of prior art binary search trees. A like logical operator term is a single logical operator term interrelating several word terms. For example, A AND B AND C uses the like AND logical operator term to interrelate the three word terms A, B, and C. Similarly, A NEAR3 B NEAR3 C uses the like logical operator term NEAR3 to interrelate the three word terms A, B, and C. The inventive method may be implemented by a variety of structures. One such structure is an n-ary Boolean search tree. A binary search tree has two word terms associated with a like logical operator term. Similarly, a tertiary search tree has three words associated with a like logical operator term. The term "n-ary" refers to a Boolean search tree with an indeterminate number of branches associated with a like logical operator term.

The presently preferred embodiment of the invention uses an n-ary search tree to evaluate the Boolean operators. The present system represents an improvement over a simple binary search tree because the present system evaluates all relevant logical operator terms in one pass through the text file and does not create the intermediate files used by a binary search tree as described above. This results in a significant savings in search time as well as allowing searching to be conducted using a lower cost computer with less memory.

Figure 1:
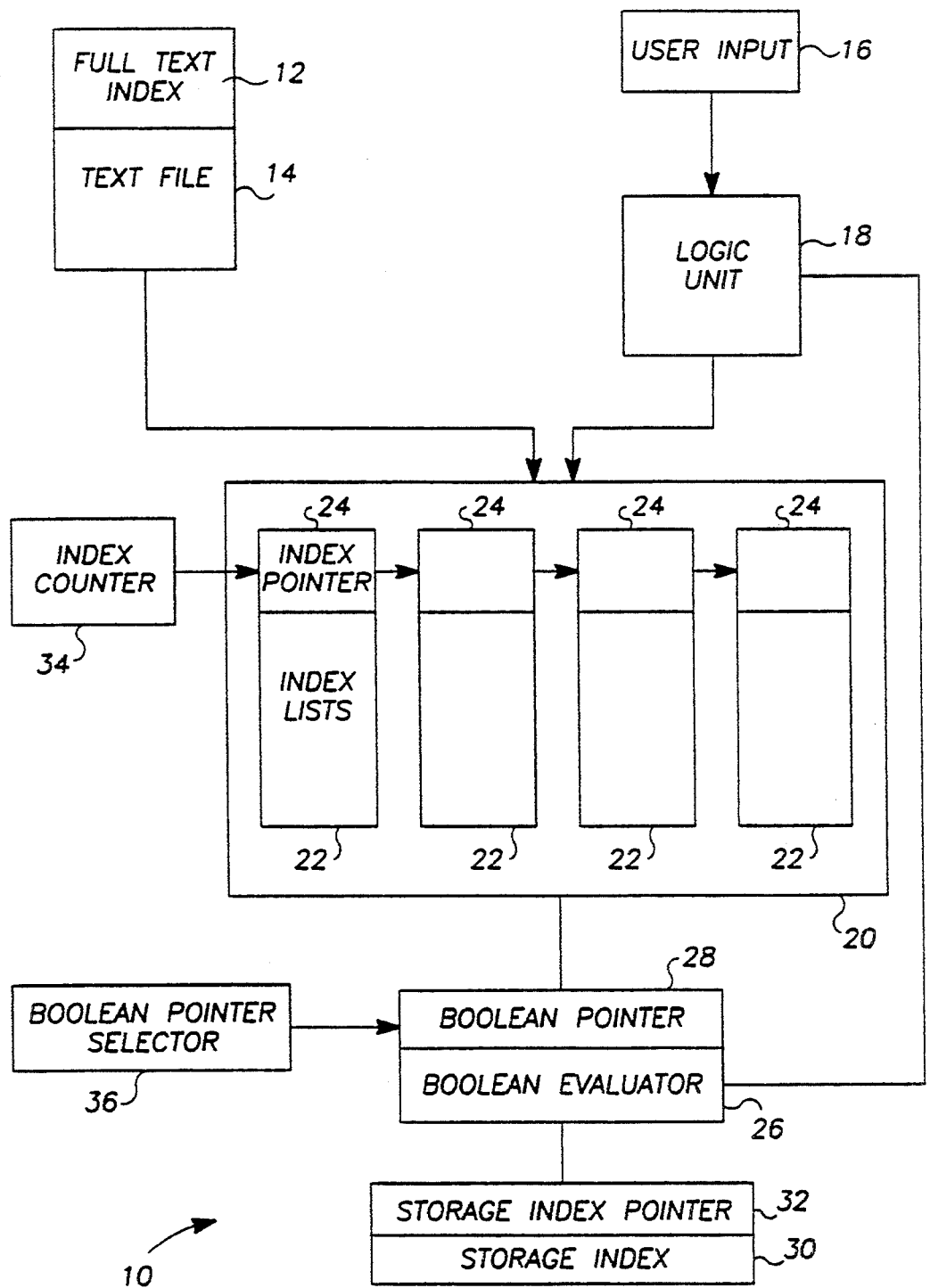
FIG. 1 is a functional block diagram of the present invention.

As shown in FIG. 1, the system 10 of the present invention uses a full text index 12, which is part of a text file 14. The term text file is a broad term which is meant to encompass any data file or files to be searched. For example, an encyclopedia contained on a compact disc (CD) as a form of read-only memory (ROM), which is typically called a CD ROM, is sold in a form that contains a full text index 12 usable with the present invention. The full text index may be any one of several various formats. The full text index 12 contains a listing of all words in the text file 14 and the location of each word within the text file. In one embodiment, the full text index 12 is created in a well known fashion by forming a tree in which the word prefixes are listed in what are commonly called nodes of the tree. The various suffixes branch out from the nodes of the tree. For example, the prefix "wood" may have suffixes such as "man," "work," and "y," corresponding to the words "woodsman," "woodwork," and "woody." The full text index 12 contains an index of all locations within the text file 14 where the prefix "wood" occurs. The index also contains the locations of the various suffixes within the text fie. When a text search is initiated, the full text index is used to determine the locations of the user-selected word terms.

The system 10 uses a logic unit 18 to construct an n-ary Boolean search tree corresponding to the user-selected word terms and user-specified logical operator terms interrelating the user-selected word terms. As discussed, there are numerous techniques well known to those of skill in the art for entering user input into a computer. These techniques are generically represented as a user input 16.

A search tree consists of a root node which is analyzed to produce the final results of a search, one or more terminal nodes containing the word terms selected by the user, and may have one or more non-terminal nodes containing the logical operator terms interrelating the word terms. The details of the n-ary search tree will be discussed in greater detail below.

The word terms in the terminal nodes are used to construct a plurality of index lists 22. Each index list 22 corresponds to a word term. The index lists are constructed using the full text index 12 and sequentially list each occurrence of the word term within the text file 14. Each index list 22 also contains an index pointer 24 that points to the present location of the word term being analyzed. For example, the index pointer 24 for the word term A initially points to the first occurrence of the word term A within the text file 14. As the system 10 analyzes the occurrences in the index list 22, the index pointer 24 is incremented so that it points to the next sequential occurrence of the word term within the text file 14. A more detailed description of the index list 22 and the operation of the index pointer 24 will be provided below.

A Boolean evaluator 26 applies logical operator terms to the word terms in the index lists 22 associated with the logical operator terms being analyzed to determine if the word terms satisfy the logical operator terms. A Boolean pointer 28 points to the non-terminal node currently being analyzed. The system 10 analyzes the non-terminal nodes one at a time starting at the non-terminal node furthest from the root node. A storage index 30 associated with each of the non-terminal nodes temporarily stores the results of the analysis. If there are no hits, the storage index 30 will be empty. If the results of the analysis produce one or more hits, the storage index 30 will contain a sequential list of the locations within the text file 14 where the word terms satisfy the logical operator term interrelating the word terms. The results stored in the storage index 30 will be used in the analysis of subsequent non-terminal nodes. A storage index pointer 32 is used in the same manner as the index pointer 24 when the Boolean evaluator 26 is applied to subsequent non-terminal nodes.

As stated above, the Boolean evaluator 26 analyzes the index lists 22 to determine if any of the word terms satisfy the logical operator term. The Boolean evaluator 26 uses the index pointer 24 to analyze the location within each index list 22 that is currently pointed to by the index pointer 24. The index pointer 24 initially points to the first occurrence of each word term in the index list 22. Following each analysis by the Boolean evaluator 26, an index counter 34 will advance the index pointer 24 for one of the index lists 22. The index pointer 24 initially points to the first occurrence of each word term in the index list 22. Following each analysis by the Boolean evaluator 26, the index counter 34 will increment the index pointer 24 for one of the index lists 22. Alternatively, the index pointer may point to the last occurrence of each word term and the index counter 34 will decrement the selected index pointer 24. The index counter 34 will advance the index pointers 24 for each of the index lists 22 until every entry in each of the index lists 22 has been analyzed. The technique for determining which index pointer 24 to advance will be discussed in greater detail below. The Boolean evaluator 26 will analyze every entry in each of the index lists 22 associated with a particular logical operator term. The storage index 30 temporarily stores any hits that occurred in the analysis.

Following the completion of analysis for the non-terminal node furthest from the root node, a Boolean pointer selector 36 moves the Boolean pointer 28 from the non-terminal node furthest from the root node to an adjacent non-terminal node. Thus, the Boolean pointer 28 is always pointing to the non-terminal node currently being analyzed. The Boolean pointer selector 36 moves the Boolean pointer 28 to the adjacent non-terminal node to determine if the logical operator term at the selected non-terminal node is satisfied by the word terms associated with the non-terminal node.

As previously noted, the storage index 30 contains the results of an application of the Boolean evaluator 26 to the selected non-terminal node. If there are hits that result from the analysis of a non-terminal node, the Boolean evaluator 26 will analyze the adjacent non-terminal node using the storage index 30 from the previously analyzed non-terminal node as if the storage index 30 for the previously analyzed non-terminal node is one of the index lists 22.

In any Boolean search tree used by the system 10, the word terms are contained in one or more terminal nodes. Logical operator terms, which are contained in non-terminal nodes, interrelate the word terms contained in the terminal nodes that are adjacent to the non-terminal nodes. The final node in the search tree is typically referred to as the root node and typically contains a logical operator term.

Figure 2A:
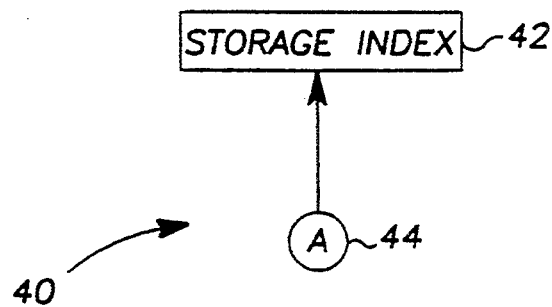
FIGS. 2A, 2B, 2C and 2D depict search trees for various text searches using the present invention.
Figure 2B:
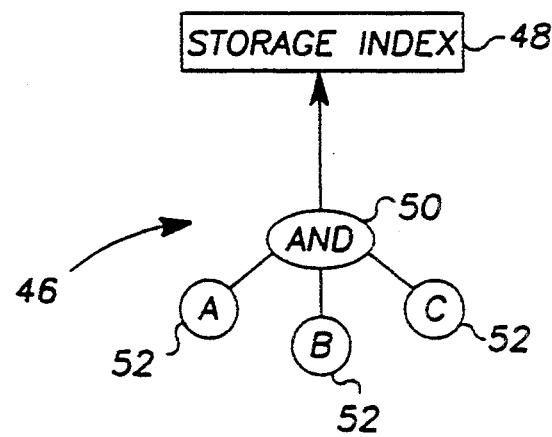

The details of the search tree of the present invention are best demonstrated by FIGS. 2A through 2D. It should be noted that the Boolean search trees depicted in FIGS. 2A–2D are shown only to provide a graphical explanation of the invention. The system 10 does not require the actual construction of the visible search tree 46 as shown in FIG. 2B. The n-ary Boolean search tree is only one of many physical embodiments of the inventive method. For the use of the inventive method, it is only necessary that the word terms and the logical interrelation of the word terms be indicated in some manner. This may be accomplished using a number of different techniques well known to those of skill in the art. One possible technique is to have a series of pointers to memory locations containing the word terms and the logical operator terms interrelating the word terms.

FIG. 2A depicts the simplest possible search tree 40 where the search is simply for word term A without any logical operator terms. In this simple search, the root node 44 will contain the word term A. A storage index 42 associated with a root node 44 will contain a list of the locations of the occurrence of A (if there is a hit in the search). There is no logical operator term in the example of FIG. 2A, so there are no non-terminal nodes.

As shown in FIG. 2B, a search tree 46, comprises a root node 50, which contains a logical operator term, and three terminal nodes 52. The terminal nodes 52 each contains one of the word terms A, B, or C. The root node 50 contains the logical operator term AND that interrelates the three terminal nodes. The text search represented by the search tree 46 is A AND B AND C. The system 10 begins analysis by constructing the search tree 46.

The system 10 creates three index lists 22 (see FIG. 1) listing each occurrence of the word terms A, B, and C, respectively, within the text file. The Boolean evaluator 26 begins analysis of the search tree 46 at the root node 50. An AND logical operator term is contained in the root node 50. The system 10 uses this like logical operator term to interrelate the three word terms in the adjacent three terminal nodes 52. The Boolean evaluator 26 will analyze the three index lists 22 for the three word terms to determine if the location of word terms represented by entries on each index list 22 currently pointed to by the index pointer 24 satisfy the logical operator term. The index pointers 24 initially point to the first entry in each of the three index lists 22. If the first entry of each of the index lists 22 satisfies the AND logical operator term, the location within the text file 14 is recorded as a hit in the storage index 48 associated with the root node 50. The technique for determining which index pointer 24 to advance will be discussed below. Any additional hits are also recorded in the storage index 48 associated with the root node 50.

Figure 2C:
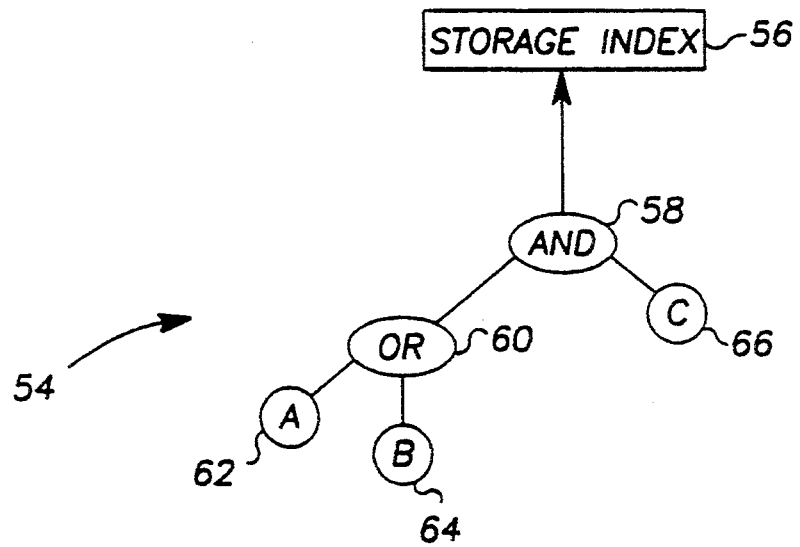

A more complex search tree 54 is illustrated in FIG. 2C where the text search is for (A OR B) AND C. This type of search is useful in situations where the user wishes to find information on various aspects of a single topic. For example, "Jefferson OR Franklin AND Constitution" may be used to determine the relation of either man to the Constitution. The search tree 54 comprises a root node 58 containing an AND logical operator term, and a non-terminal node 60 containing an OR logical operator term. There are two terminal nodes 62 and 64 related to the non-terminal node 60 containing the OR logical operator term, and a single terminal node 66 related to the root node 58 containing the AND logical operator. The terminal nodes 62 and 64 contain the word terms A and B, respectively, which are interrelated by the OR logical operator term contained in the non-terminal node 60 adjacent to the terminal nodes 62 and 64. The word term C is contained in the terminal node 66. The AND logical operator term is contained in the non-terminal node 58, which interrelates the terminal node 66 with the non-terminal node 60. The system 10 creates index lists 22 for each of the three terminal nodes 62, 64 and 66 as described above. The Boolean pointer 28 initially selects the non-terminal node 60 for analysis because it is furthest from the root node 58. Thus, the OR logical operator term will be evaluated first.

In the presently preferred embodiment, the system 10 selects the non-terminal node furthest from the root node because it is the most efficient analysis technique. However, it should be noted that the invention may also be used to analyze non-terminal nodes in any order. If two or more non-terminal nodes are equidistant from the root node, any of the equidistant non-terminal nodes may be initially selected.

The system 10 uses the index lists 22 associated with the A and B word terms and stores all hits in the storage index 30 associated with the non-terminal node 60. The techniques for determining the index pointer 24 to advance will be discussed below. Once the analysis of the non-terminal node 60 is complete, the Boolean pointer selector 36 (see FIG. 1) advances the Boolean pointer 28 so that the Boolean pointer now points to the root node 58 that is adjacent to the non-terminal node 60. The Boolean evaluator 26 applies the AND logical operator term to the index list 22 associated with the word term C and the storage index 30 associated with the root node 60. As stated above, the Boolean evaluator 26 will apply the AND logical operator term using the storage index 30 for the root node 60 as if the storage index were an index list. The storage index 56 associated with the root node 58 stores the results of the analysis of the root node 58 and thus the result of the overall search.

Figure 2D:
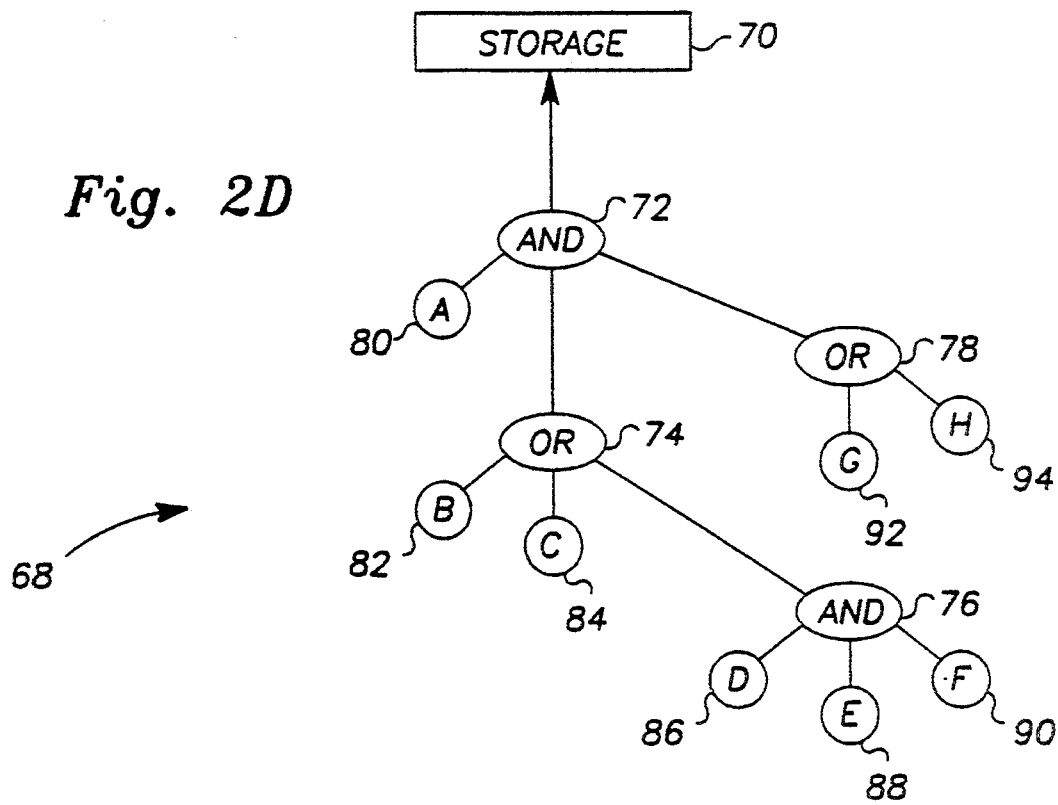

An even more complex search tree 68 is illustrated in FIG. 2D. The text search is for A AND (B OR C OR (D AND E AND F)) AND (G OR H). The search tree 68 comprises a root node 72, three non-terminal nodes 74, 76, and 78, and eight terminal nodes 80, 82, 84, 86, 88, 90, 92, and 94. As described above, the system 10 creates an index list 22 for each of the word terms contained in the terminal nodes 80, 82, 84, 86, 88, 90, 92, and 94. The Boolean pointer 28 initially points to non-terminal node 76, which is the non-terminal node furthest from the root node 72. The AND logical operator term contained within the non-terminal node 76 is applied to the index lists 22 associated with the word terms contained in the terminal nodes 86, 88, and 90. The Boolean evaluator 26 (See FIG. 1) applies the AND logical operator term to all entries in these index lists 22. The technique for determining which index pointer 24 to advance will be discussed below. When the analysis of non-terminal node 76 is complete, the storage index 30 associated with the non-terminal node 76 will contain a list of all hits resulting from the analysis of non-terminal node 76 and the associated terminal nodes 86, 88, and 90. Upon completion of the analysis of non-terminal node 76, the Boolean pointer incrementer 36 advances the Boolean pointer 28. The Boolean pointer 28 now points to the non-terminal node 74 adjacent to the non-terminal node 76 furthest from the root node 70. Once the analysis of non-terminal node 76 is complete, there is no longer a need to retain the index lists 22 associated with the terminal nodes 86, 88, and 90. The system 10 discards the index lists once they are no longer needed.

The non-terminal node 74 contains an OR logical operator term. The Boolean evaluator 26 applies the OR logical operator term to the index lists 22 associated with the word terms contained in the terminal nodes 82 and 84 adjacent to the non-terminal node 74. The Boolean evaluator 26 uses the index lists 22 created for the word terms B and C contained in the terminal nodes 82 and 84 and the storage index 30 associated with the non-terminal node 76, and evaluates three index lists according to the logical operator term contained within the non-terminal node 74. As described above, the storage index 30 associated with the non-terminal node 76 is used in the same manner as an index list when the Boolean evaluator 26 is analyzing the adjacent non-terminal node 74. All hits resulting from the analysis of non-terminal node 74 are stored within the storage index 30 associated with the non-terminal node 74. As previously discussed, once the Boolean evaluator 26 has analyzed non-terminal node 74, there is no longer a need for the index list associated with the terminal nodes 82 and 84 or the storage index 30 associated with the non-terminal node 76. The system 10 discards all three unneeded index lists. Upon the completion of analysis of the non-terminal node 74, the Boolean pointer incrementer 36 advances the Boolean pointer 28. Normally, the Boolean pointer would select the root node 72 for analysis, but analysis of root node 72 requires the prior analysis of non-terminal node 78. Therefore, the Boolean pointer 28 will select the non-terminal node 78 and analyze that node first.

The non-terminal node 78 contains an OR logical operator term. The Boolean evaluator 26 uses the index lists 22 associated with the word terms G and H contained in the terminal nodes 92 and 94 to analyze the non-terminal node 78. Any hits that result from the analysis of non-terminal node 78 are stored in the storage index 30 associated with the non-terminal node 78. As with other unneeded index lists, the index lists 22 associated with the terminal nodes 92 and 94 are no longer needed and are discarded by the system 10. The Boolean pointer selector 36 advances the Boolean pointer 28, and the Boolean pointer 28 now points to the root node 72. The Boolean evaluator 26 uses the index list 22 associated with the word term A contained in the terminal node 80 and the storage indices 30 associated with the non-terminal nodes 74 and 78 to evaluate the root node 72. Any hits resulting from the evaluation of root node 72 are stored in the storage index 70 associated with the root node 72.

Searches involving logical operators such as NOT and NEAR are analyzed by the Boolean evaluator 26 in the same manner as described above. As can be readily seen from the examples presented, the system 10 can perform complex searches using the method of the present invention. One aspect of the innovative method is determining which index pointer 24 should be incremented.

A Boolean evaluator 26 applies the logical operator term of the non-terminal node to the word terms contained in terminal nodes adjacent to the non-terminal node to determine whether any of the word terms satisfy the logical operator term of the non-terminal node. For example, in the search tree 46 of FIG. 2B, the text search is for A AND B AND C. The system 10 creates an index list 22 for each of the three word terms A, B, and C using the full text index 12. A sample of the three index lists is shown below in Table 1:

TABLE 1

| Sample Index Lists | | |
|---|---|---|
| A | B | C |
| (1,3) | (1,5) | (2,6) |
| (1,24) | (2,9) | (2,22) |
| (2,44) | (2,20) | (3,7) |
| (4,50) | (2,35) | (3,19) |
| (5,5) | (3,47) | (3,25) |
| (5,23) | (4,20) | (4,5) |
| (5,61) | (4,98) | (4,35) |
| (6,8) | (5,15) | (5,17) |
| (6,37) | (6,50) | |
| (7,24) | (8,19) | |
| (9,39) | | |

Note that the table is merely illustrative of many different index list techniques. The table indicates that the word term A occurs in document 1, location 3; document 1, location 24; document 2, location 44; document 4, location 0; document 5, location 5; document 5, location 23; document 5, location 61; document 6, location 8; document 6, location 37; document 7, location 24; and document 9, location 39. Similarly, word term B occurs in document 1, location 5; document 2, location 9; document 2, location 20; document 2, location 35; document 3, location 47; document 4, location 20; document 4, location 98; document 5, location 15; document 6, location 50; and document 8, location 19. Finally, the word term C occurs in document 2, location 6; document 2, location 22; document 3, location 7; document 3, location 19; document 3, location 25; document 4, location 5; document 4, location 35; and document 5, location 17. It should be noted that the term document could refer to an entire text file if many text files are being searched, or it could refer to a chapter or page within a particular text file. Similarly, the term location could refer to a page, a paragraph, a word or the like. Thus, the terms document and location should be interpreted very broadly to include any means for identifying the location of user-selected word terms. In Table 1, the first number refers to the text file or chapter, while the second number refers to the specific location such as page number within a document or a paragraph number within a chapter. Thus, the number (1,3) indicates, for example, document 1, page 3. Similarly the number (3,1) indicates document 3, page 1. For purposes of this example, a hit occurs when the first number (indicating the document) meets the conditions imposed by the logical operator term.

The index pointer 24 initially points to the first entry for each of the three index lists in Table 1. When the Boolean evaluator 26 evaluates the AND logical operator term contained within the non-terminal node 50, the Boolean evaluator first applies the logical operator term to the first entry in each of the index lists 22. In the example above, the first occurrence of each of the word terms A, B, and C is (1,3), (1,5), and (2,6), respectively. Therefore, the first evaluation of the AND logical operator term to the index lists does not result in a hit.

The next question is which index pointer should be advanced so that the system 10 does not overlook any possible matches. The system 10 of the present invention increments the index pointer 24 for the index list 22 in which the particular occurrence within the text file 14 currently being pointed to by the index pointers is closest to the beginning of the text file. Note that if the index lists 22 were constructed starting at the end of the text file 14, index pointer 24 for the index list which is the particular occurrence within the text file is closer to the end of the text file.

In the present example, word term A occurs at (1,3) while the word term B occurs at (1,5) and word term C occurs at (2,6). The current occurrence being pointed to by the index pointer 24 for the word term A is closest to the beginning of the text file 14 when compared to the current occurrence being pointed to by the index pointer 24 for the word terms B and C (i.e., (1,3) versus (1,5) or (2,6)). Therefore, the index counter 34 will advance the index pointer 24 associated with the index list 22 for word term A. Following the advancement of the index pointer 24 for index list 22 associated with the word term A, the current occurrence for each of the index lists for the word terms & B, and C is (1,24), (1,5), and (2,6), respectively. Note that only the index pointer 24 for the index list 22 associated with the word term A is advanced. As can be seen, the evaluation of these locations in the index lists 22 by the Boolean evaluator 26 does not result in a hit.

Using the above-described procedure, it can readily be determined that the index pointer 24 for word term B is at (1,5) while the word term A is at (1,24) and word term C is at (2,6). Therefore, the index counter 34 will advance the index pointer 24 associated with the index list 22 for word term B. Following the advancement of the index pointer 24 for the index list 22 associated with the word term B, the current occurrence of index lists for the word terms A, B, and C are (1,24), (2,9), and (2,6), respectively. Again, the evaluation of the current occurrences of the three index lists does not result in a match. Using the abovedescribed procedure, the index pointer 24 for the index list associated with the word term A is advanced, resulting in the current occurrences of the index lists 22 for the word terms A, B, and C being at (2,44), (2,9), and (2,6), respectively. The application of the AND logical operator term to the current occurrences of the three index lists results in a hit because all three required word terms occur within document 2. As noted above, the terms document and location are to be broadly interpreted. If the user wished to locate the occurrence of A AND B AND C on the same page, the term document may be interpreted to be a page and the term location could refer to a paragraph or word. The location of the hit is recorded in the storage index 48 associated with the root node 50 containing the AND logical operator term.

The system 10 uses a different technique for determining which index pointer 24 to advance following a successful match. Instead of advancing the index pointer for the current occurrence closest to the beginning of the text file 14 (i.e., the end of the index lists where the index pointer initially pointed), the system looks at the next occurrence in each of the index lists and advances the index pointer for the next occurrence that is closest to the beginning of the text file. In the example given above, the current locations of the index lists for each of the word terms A, B, and C are (2,44), (2,9), and (2,6), respectively. Thus, the next occurrence in the index lists for each of the word terms A, B, and C is (4,50), (2,20), and (2,22), respectively. Since the next occurrence closest to the beginning of the text file 14 in each of the three index lists 22 occurs in the index list for word term B, (i.e. (2,20) versus (4,50) or (2,22)), the index pointer 24 for the index list 22 associated with the word term B is advanced. Following the advancement of the index pointer 24 for the index list associated with the word term B, the then current occurrences of the index lists for the word terms A, B, and C are (2,44), (2,20), and (2,22), respectively. The application of the AND logical operator term to these current locations of the three index lists 22 results in another hit because all three required word terms occur a second time within document 2. The location of the hit is recorded in the storage index 48 associated with the root node 50 containing the AND logical operator term.

Using the above-described procedure following the successful match, the index pointer 24 for the index list 22 associated with the word term B is again advanced, and the current occurrences of the index lists for the word terms A, B, and C are (2,44), (2,35), and (2,22), respectively. The application of the AND logical operator term to these current occurrences of the three index lists results in another hit because all three required word terms occur a third time within document 2. The location of the hit is recorded in the storage index 48 associated with the root node 50 containing the AND logical operator term. Using the above-described procedure of looking at the next occurrence in each index list following the successful match, the index pointer 24 for the index list 22 associated with the word term C is advanced, and the current occurrences of the index lists for the word terms A, B, and C are (2,44), (2,35), and (3,7), respectively. The application of the AND logical operator term to the current occurrences of the three index lists 22 does not result in a hit. Using the two different techniques described above, the system 10 analyzes the three index lists to determine all occurrences of the word terms A, B, and C that satisfy the AND logical operator term that interrelates the word terms.

Table 2, shown below, indicates which of the two different techniques are used for different logical operators. Note that the term "Current" refers to the examination of the current occurrence in the text file 14 as indicated by the various index pointers, and its appearance in Table 2 indicates that the index counter 34 will advance index pointer 24 for the index list 22 whose current occurrence in the text file is closest to the beginning of the text file. The term "Next" refers to the next occurrence of a word term in the text file 14 as indicated by the various index pointers 24, and its appearance in Table 2 indicates that the index counter 34 will advance the index list whose next occurrence in the text file is closest to the beginning of the text file. Although reference is made to the "beginning" of the text file, if the index pointer is initially pointed at the bottom of the index list, the beginning refers to the occurrence at the bottom of the index list. In other words, the process of moving the index pointer 24 starts at the bottom of the list and moves up the list (i.e., is decremented).

TABLE 2

| Index Increment for Various Logical Operators | | |
|---|---|---|
| Operator | Hit | No Hit |
| AND | Next | Current |
| OR | Current | Current |
| NOT | Next | Current |
| PHRASE | Next | Current |
| NEAR | Next | Current |

There are some rare situations that are not covered by the procedures described in Table 2. If the PHRASE logical operator is used with repeating word terms, the index pointer 24 for the first word term is incremented. For example, PHRASE AA will result in a tie in location within the text file 14 if a hit occurs, so that the procedure listed in Table 2 will not work correctly. To avoid this problem, the system 10 advances the index pointer 24 for the first word term.

Figure 3:
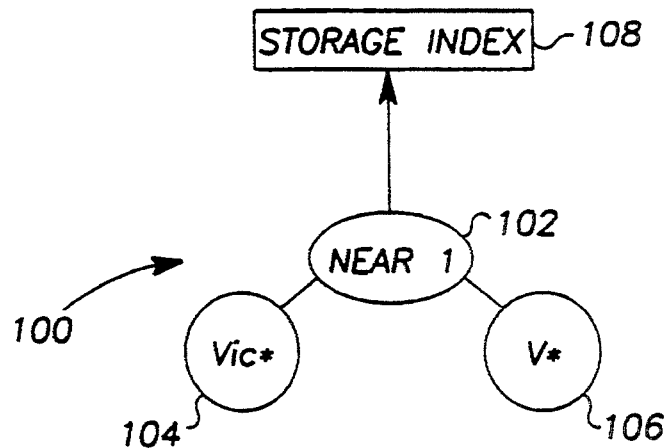
FIG. 3 depicts a search tree evaluated using the method of the present invention.

Another unusual situation in which the procedure described in Table 2 is not used occurs if several word terms have the same next occurrence, but do not have the same current occurrence. In that event, the current index pointer locations are analyzed to determine which index pointer to advance instead of the next occurrence in the index list. For example, if a user cannot remember the name of the film, "Victor, Victoria," he may execute a search program for "Vic* NEAR1 V*," as illustrated in FIG. 3. The Boolean search tree 100 has a root node 102 containing the logical operator term NEAR1 and two terminal nodes 104 and 106 containing the word terms "Vic*" and "V*," respectively. The results of the search are stored in the storage index 108 associated with the root node 102. The system 10 may construct the following index lists for "Vic*" and "V*":

| Vic* | V* |
|---|---|
| (7,2) | (7,1) |

-continued

| Vic* | V* |
| --- | --- |
| (7,4) | (7,2) |
| (8,8) | (7,3) |
|  | (7,4) |
|  | (8,8) |

When the Boolean evaluator 26 (see FIG. 1) begins the analysis, the index pointers 24 point to the first occurrence in each of the two index lists 22. The application of the logical operator term NEAR1 results in a hit at location (7,2), (7,1). The hit is recorded in the storage index 108 associated with the root node 102. Using the above-described procedure following a hit, the index pointer 24 for the index list for the word term "V*" is advanced, resulting in the current occurrences for the index lists for the word terms "Vic" and "V*" being (7,2) and (7,2), respectively. As can readily be seen, the application of the logical operator term does not result in a hit, because the NEAR operator does not include word terms having a simultaneous occurrence within the text file.

When the application of a logical operator term does not result in a hit, the normal procedure, shown in Table 2, is to advance the index pointer for the index list whose current occurrence is closest to the beginning of the text file. Because the two index lists have the same current occurrence, the system 10 could arbitrarily advance the index pointer 10 for either index list. For the sake of consistency, the presently preferred embodiment of the system 10 will advance the index pointer 24 for the second index list, resulting in the current occurrence for the two index lists being (7,2) and (7,3), respectively.

The application of the logical operator term to the current occurrences results in a hit at location (7,2), (7,3). The hit is recorded in the storage index 108 associated with the root node 102. The normal procedure following a hit is to advance the index pointer 24 for the index list 22 whose next occurrence is closest to the beginning of the text file. However, the next occurrence for each of the two index lists in this example is (7,4). If the system 10 follows the above-described rule of advancing the index pointer for the second list, the current occurrences for the two index lists would be (7,2) and (7,4). The system 10 would thus incorrectly miss the hit (7,4) (7,3).

Therefore, in the rare situations in which the current occurrences are different and the next occurrences are the same, the system 10 will advance the index pointer 24 for the index list 22 whose current occurrence is closest to the beginning of the text file (i.e., the system uses the current occurrence instead of the next occurrence). In the example above, the current occurrence for the two index lists is (7,2) and (7,4), respectively. Thus, the index pointer for the "V*" index list is advanced, resulting in current occurrences for the index lists being (7,3) and (7,4), respectively.

While the above exceptions to the procedures described in Table 2 are rare, they may occur. However, using the description of the exceptions, in combination with Table 2, the system 10 can efficiently search text files and correctly discover all occurrences of user-selected text that satisfies the user-specified conditions. The system 10 is designed to operate on a microcomputer with limited memory capacity.

It is to be understood that even though numerous embodiments and advantages of the present invention have been set forth in the foregoing description, the above disclosure is illustrative only, and changes may be made in detail yet remain within the broad principles of the invention. Therefore, the present invention is to be limited only by the appended claims.

I claim:

1. A method of searching a text file for the occurrence of user-selected portions of text that satisfy user-specified conditions, the method comprising the steps of:

(a) providing a full-text index containing location information about all words in the text file;

(b) constructing an n-ary Boolean search tree corresponding to the user-selected text portions and a logical interrelation of the user-selected text portions required to satisfy the user-specified conditions where n is greater than two, said search tree containing a plurality of terminal nodes defining a plurality of word terms corresponding to the user-selected text portions, a plurality of non-terminal nodes each containing a logical operator term corresponding to said logical interrelation of said word terms, and a root node corresponding to portions of the text file where the user-selected text portions satisfy the user-specified conditions;

(c) constructing a plurality of index lists, corresponding in number to said plurality of word terms, from said full-text index, each of said index lists associated with a corresponding word term and containing a sequential listing of all occurrences of said corresponding word term in the text file starting at a first end of the text file and the location in the text file of each occurrence of said corresponding word term;

(d) providing an index pointer for each of said plurality of index lists, each of said index pointers selecting a current occurrence in each of said plurality of index lists, said index pointers initially selecting a first location in each of said plurality of index lists;

(e) providing a Boolean pointer pointing to a selected non-terminal node on said search tree;

(f) applying said logical operator term at said selected non-terminal node to said current occurrence in each of said plurality of index lists for word terms at terminal nodes adjacent to said selected non-terminal node;

(g) generating a hit indicator when said occurrence in each of said plurality of index lists for word terms at terminal nodes adjacent to said selected non-terminal node satisfies said logical operator term at said selected non-terminal node;

(h) temporarily storing a list of locations within the text file for which the word terms at adjacent terminal nodes satisfy said logical operator term at each of said non-terminal nodes; and (i) advancing said index pointer for one of said index lists for which said current occurrence is at the location in the text file nearest said first end if said hit indicator is not generated or if said logical operator term at said selected non-terminal node is an OR operator, and advancing said index pointer for one of said index lists for which the next sequential occurrence in the text file is at the location in the text file nearest said first end if said hit indicator is generated.

2. The method of claim 1 wherein step (e) initially selects the non-terminal node furthest from said root node.

3. The method of claim 1 further including the step of analyzing to determine if a non-terminal node adjacent to said selected non-terminal node has an adjacent non-terminal node further from said root node that have not been analyzed by steps (f)-(i).

4. The method of claim 1, further including the step of advancing said Boolean pointer to a non-terminal node adjacent to said selected non-terminal node and selecting said adjacent non-terminal node as a new present location if said step of analyzing determines that said adjacent non-terminal node has no non-terminal node further from said root node that has not been analyzed by steps (f)-(i), or advancing said Boolean pointer to said non-terminal node further from said root node if said step of analyzing determines that said non-terminal node further from said root node has not been analyzed by steps (f)-(i).

5. The method of claim further including the step of discarding said list of locations once steps (f)-(i) have analyzed a non-terminal node adjacent to said selected non-terminal node.

6. A method of searching a text file for the occurrence of user-selected portions of text that satisfy user-specified conditions, the text file having a full-text index containing location information about all words in the text file, the method comprising the steps of:
 (a) constructing an n-ary Boolean search tree corresponding to the user-selected text portions and a logical interrelation of the user-selected text portions required to satisfy the user-specified conditions where n is greater than two, said search tree containing a plurality of terminal nodes defining a plurality of word terms corresponding to the user-selected text portions, a plurality of non-terminal nodes each containing a logical operator term corresponding to said logical interrelation, and a root node corresponding to portions of the text file where the user-selected text portions satisfy the user-specified conditions;
 (b) constructing a plurality of index lists, corresponding in number to said plurality of word terms, from the full-text index, each of said index lists associated with a corresponding word term and containing a sequential listing of all occurrences of said corresponding word term in the text file of each occurrence of said corresponding word term;
 (c) providing an index pointer for each of said plurality of index lists, each of said index pointers selecting a current occurrence in each of said plurality of index lists, said index pointers initially selecting a first location in each of said plurality of index lists;
 (d) providing a Boolean pointer pointing to a selected non-terminal node on said search tree;
 (e) applying said logical operator term at said selected non-terminal node to said current occurrence in each of said plurality of index lists for word terms at terminal nodes adjacent to said selected non-terminal node;
 (f) generating a hit indicator when said current occurrence in each of said plurality of index lists for word terms at terminal nodes adjacent to said selected non-terminal node satisfies said logical operator term at said selected non-terminal node;
 (g) temporarily storing a list of locations within the text file for which the word terms at adjacent terminal nodes satisfy said logical operator term at each of said non-terminal nodes; and
 (h) advancing said index pointer for one of said index lists for which said current occurrence is at the location in the text file nearest said first end if said hit indicator is not generated or if said logical operator item at said selected non-terminal node is an OR operator, and advancing said index pointer for one of said index lists for which the next sequential occurrence in the text file is at the location in the text file nearest said first end if said hit indicator is generated.

7. The method of claim 6 wherein step (d) initially selects the non-terminal node furthest from said root node.

8. The method of claim 6 further including the step of analyzing to determine if a non-terminal node adjacent to said selected non-terminal node has an adjacent non-terminal node further from said root node that have not been analyzed by steps (e)-(h).

9. The method of claim 6, further including the step of advancing said Boolean pointer to a non-terminal node adjacent to said selected non-terminal node and selecting said adjacent non-terminal node as a new present location if said step of analyzing determines that said adjacent non-terminal node has no non-terminal node further from said root node that has not been analyzed by steps (e)-(h), or advancing said Boolean pointer to said non-terminal node further from said root node if said step of analyzing determines that said non-terminal node further from said root node has not been analyzed by steps (e)-(h).

10. The method of claim further including the step of discarding said list of locations once steps (e)-(h) have analyzed a non-terminal node adjacent to said selected non-terminal mode.

11. A method of searching a text file for the occurrence of user-selected text portions that satisfy user-specified conditions, the text file containing a full text index having information about the location of all words in the text file, the system comprising:
 (a) entering user-selected text portions and user-specified conditions;
 (b) defining a plurality of word terms corresponding to the user-selected text portions and a plurality of logical operator terms corresponding to the user-specified conditions that interrelate the user-selected text portions;
 (c) constructing a plurality of index lists from the full text index, said plurality of index lists corresponding in number to said plurality of word terms and containing a sequential listing of all occurrences of said corresponding word term in the text file, starting at a first end of the text file, and indicating the location of each occurrence in the text file;
 (d) providing an index pointer for each of said plurality of index lists, each of said index pointers selecting a current occurrence in each of said plurality of index lists;
 (e) providing a Boolean pointer selecting one of said plurality of logical operator terms;
 (f) evaluating said selected logical operator term by applying said selected logical operator term to said current occurrence in each of said plurality of index lists for word terms interrelated by said selected logical operator term, and generating a hit indicator when said current occurrence in each of said plurality of index fists for word terms interrelated by said selected logical operator term satisfies said selected logical operator term;

(g) storing said current occurrence in each of said plurality of index lists for word terms interrelated by said selected logical operator term if step (f) generates a hit indicator; and (h) advancing said index pointer to the next sequential occurrence for the one of said index lists for which said current occurrence in the text file is at the location in the text file nearest said first end if step (f) does not generate a hit indicator or if said selected logical operator term is an OR operator, and advancing said index pointer to the next sequential occurrence for the one of said index lists for which said next sequential occurrence in the text file is at the location in the text file nearest said first end if step (f) does generate a hit indicator.

12. The method of claim 11, further including the step of discarding said index lists for word terms interrelated by said selected logical operator term after steps (e)–(h) complete evaluation of said selected logical operator term using said plurality of index lists for word terms interrelated by said selected logical operator term.

13. The method of claim 11 further including the step of advancing said Boolean pointer to a new selected logical operator term which has not previously been evaluated by steps (e)–(h) following completion of evaluation of said selected logical operator term by steps (e)–(h).

14. A method of searching a text file for the occurrence of user-selected text portions that satisfy a user-specified condition, the text file containing a full text index having information about the location of all words in the text file, the system comprising:

(a) entering user-selected text portions and user-specified conditions;

(b) defining a plurality of word terms corresponding to the user-selected text portions and a logical operator term corresponding to the user-specified condition that interrelates the user-selected text portions;

(c) constructing a plurality of index lists from the full text index, said plurality of index lists corresponding in number to said plurality of word terms and containing a sequential listing of all occurrences of said corresponding word term in the text file, starting at a first end of the text file, and indicating the location of each occurrence in the text file;

(d) providing an index pointer for each of said plurality of index lists, each of said index pointers selecting a current occurrence in each of said plurality of index lists;

(e) evaluating said logical operator term by applying said logical operator term to said current occurrence in each of said plurality of index lists for word terms interrelated by said logical operator term, and generating a hit indicator when said current occurrence in each of said plurality of index lists for word terms interrelated by said logical operator term satisfies said logical operator term;

(f) storing said current occurrence in each of said plurality of index lists for word terms interrelated by said logical operator term if step (e) generates a hit indicator; and (g) advancing said index pointer to the next sequential occurrence for the one of said index lists for which said current occurrence in the text file is at the location in the text file nearest said first end if step (e) does not generate a hit indicator or if said logical operator term is an OR operator and advancing said index pointer to the next sequential occurrence for the one of said index lists for which said next sequential occurrence in the text file is at the location in the text file nearest said first end if step (e) does generate a hit indicator.

15. A system for searching a text file for the occurrence of user-selected text portions that satisfy a user-specified condition, the text file containing a full text index having information about the location of all words in the text file, the system comprising:

a user input allowing the user to enter the user-selected text portions and the user-specified condition;

a logic unit defining a plurality of word terms corresponding to the user-selected text portions and a logical operator term corresponding to the user-specified condition interrelating the user-selected text portions;

a plurality of index lists constructed from the full text index, said plurality of index lists corresponding in number to said plurality of word terms and containing a sequential listing of all occurrences of said corresponding word term in the text file, starting at a first end of the text file, and indicating the location of each occurrence in the text file;

an index pointer for each of said plurality of index lists, each of said index pointers selecting a current occurrence in each of said plurality of index lists;

an analyzer evaluating said logical operator term by applying said logical operator term to said current occurrence in each of said plurality of index lists for word terms interrelated by said logical operator term, said analyzer generating a hit indicator when said current occurrence in each of said plurality of index lists for word terms interrelated by said logical operator term satisfies said logical operator term;

a storage unit associated with said logical operator term for storing said current occurrence in each of said plurality of index lists for word terms interrelated by said logical operator term if said analyzer generates a hit indicator; and an index selector advancing said index pointer to the next sequential occurrence for the one of said index lists for which said current occurrence in the text file is at the location in the text file nearest said first end if said analysis means did not generate a hit indicator or if said logical Operator term is an OR operator, and advancing said index pointer to the next sequential occurrence for the one of said index lists for which said next sequential occurrence in the text file is at the location in the text file nearest said first end if said analysis means did generate a hit indicator.

16. A system for searching a text file for the occurrence of user-selected text portions that satisfy user-specified conditions, the system comprising:

a full-text index containing location information about all words in the text file;

a logic unit constructing an n-ary Boolean search tree corresponding to the user-selected text portions and a logical interrelation of the user-selected text portions required to satisfy the user-specified conditions where n is greater than two, said search tree containing a root node defining a logical operator term that, if satisfied, corresponds to portions of the text file where the user-selected text portions satisfy the user-specified conditions, a plurality of terminal nodes defining a plurality of word terms corresponding to the user-selected text portions, and a plurality of non-terminal nodes each containing art additional logical operator term corresponding to said logical interrelation of said plurality of word terms;

a plurality of index lists, corresponding in number to said plurality of word terms, constructed from said full-text index, each of said index lists associated with a corresponding one of said plurality of word terms and containing a sequential listing of all occurrences of said corresponding word term in the text file, starting at a first end of the text file, and the location in the text file of each occurrence of said corresponding word term;

an index pointer for each of said plurality of index lists, each of said index pointers selecting a current occurrence in each of said plurality of index lists, said index pointers initially selecting a first location in each of said plurality of index lists as said current occurrence;

a Boolean pointer pointing to a selected non-terminal node on said search tree;

a Boolean evaluator applying said additional logical operator term at said selected non-terminal node to said current occurrence in each of said plurality of index lists for word terms at terminal nodes adjacent to said selected non-terminal node, said Boolean evaluator generating a hit indicator when said current occurrence in each of said plurality of index lists for word terms at terminal nodes adjacent to said selected non-terminal node satisfies said additional logical operator term at said selected non-terminal node;

a storage index for each of said non-terminal nodes temporarily storing a list of locations within the text file for which the word terms at said adjacent terminal nodes satisfy said additional logical operator term at each of said non-terminal nodes; and an index selector advancing said index pointer to the next sequential occurrence for one of said index lists for which said current occurrence in the text file is at the location in the text file nearest said first end if said Boolean evaluator did not generate said hit indicator or if said additional logical operator term at said selected non-terminal node is an OR operator, and advancing said index pointer for one of said index lists for which the next sequential occurrence in the text file is at the location in the text file nearest said first end if said Boolean evaluator did generate said hit indicator.

17. The system of claim 16 wherein said Boolean pointer initially selects said non-terminal node furthest from said root node.

18. The system of claim 16, further including analysis means for determining if a non-terminal node adjacent to said selected non-terminal node has adjacent non-terminal nodes further from said root node that have not been analyzed by said Boolean evaluator.

19. The system of claim 18, further including a Boolean pointer selector advancing said Boolean pointer to a non-terminal node adjacent to said selected non-terminal node and selecting said adjacent non-terminal node as a new present location if said analysis means determines that said adjacent non-terminal node has no non-terminal node further from said root node that has not been analyzed by said Boolean evaluator, said Boolean pointer selector advancing said Boolean pointer to said non-terminal node further from said root node if said analysis means determines that said non-terminal node further from said root node has not been analyzed by said Boolean evaluator.

20. The system of claim 16 wherein said storage index for said selected non-terminal node discards said list of locations once said Boolean evaluator has applied said additional logical operator at a non-terminal node adjacent to said selected non-terminal node.

21. A system for searching a text file for the occurrence of user-selected text portions that satisfy user-specified conditions, the text file containing a full-text index having information about the location of all words in the text file, the system comprising:

a logic unit constructing an n-ary Boolean search tree corresponding to the user-selected text portions and a logical interrelation of the user-selected text portions required to satisfy the user-specified conditions where n is greater than two, said search tree containing a root node defining a logical operator term that, if satisfied, corresponds to portions of the text file where the user-selected text portions satisfy the user-specified conditions, a plurality of terminal nodes defining a plurality of word terms corresponding to the user-selected text portions, and a plurality of non-terminal nodes each containing an additional logical operator term corresponding to said logical interrelation of said plurality of word terms;

a plurality of index lists, corresponding in number to said plurality of word terms, constructed from the full-text index, each of said index lists associated with a corresponding one of said plurality of word terms and containing a sequential listing of all occurrences of said corresponding word term in the text file, starting at a first end of the text file, and the location in the text file of each occurrence of said corresponding word term;

an index pointer for each of said plurality of index lists, each of said index pointers selecting a current occurrence in each of said plurality of index lists, said index pointers initially selecting a first location in each of said plurality of the lists as said current occurrence;

a Boolean pointer pointing to a selected non-terminal node on said search tree;

a Boolean evaluator applying said additional logical operator term at said selected non-terminal node to said current occurrence in each of said plurality of index lists for word terms at terminal nodes adjacent to said selected non-terminal node, said Boolean evaluator generating a hit indicator when said current occurrence in each of said plurality of index lists for word terms at terminal nodes adjacent to said selected non-terminal node satisfies a logical operator term at said selected non-terminal node;

a storage index for each of said non-terminal nodes temporarily storing a list of locations within the text file for which the word terms at said adjacent terminal nodes satisfy a logical operator term at each of said non-terminal nodes; and an index selector advancing said index pointer to the next sequential occurrence for one of said index lists for which said current occurrence in the text file is at the location in the text file nearest said first end if said Boolean evaluator did not generate said hit indicator or if a logical operator term at said selected non-terminal node is an OR operator, and advancing said index pointer for one of said index lists for which the next sequential occurrence in the text file is at the location in the text file nearest said first end if said Boolean evaluator did generate said hit indicator.

22. The system of claim 21 wherein said index selector advances said index pointer to the next sequential occurrence in the text file for one of said index lists for which said current occurrence in the text file is at the location in the text file nearest said first end if said Boolean evaluator did generate said hit indicator if said current occurrence for each of said index lists is not identical and said next sequential occurrence for each of said index lists is identical.

23. The system of claim 21 wherein said Boolean pointer initially selects said non-terminal node furthest from aid root node.

24. The system of claim 21 further including analysis means for determining if a non-terminal node adjacent to said selected non-terminal node has adjacent non-terminal nodes further from said root node that have not been analyzed by said Boolean evaluator.

25. The system of claim 24, further including a Boolean pointer selector advancing said Boolean pointer to a non-terminal node adjacent to said selected non-terminal node and selecting said adjacent non-terminal node as a new present location if said analysis means determines that said adjacent non-terminal node has no non-terminal node further from said root node that has not been analyzed by said Boolean evaluator, said Boolean pointer selector advancing said Boolean pointer to said non-terminal node further from said root node if said analysis means determines that said non-terminal node further from said root node has not been analyzed by said Boolean evaluator.

26. The system of claim 21 wherein said storage index for said selected non-terminal node discards said list of locations once said Boolean evaluator has applied said additional logical operator at a non-terminal node adjacent to said selected non-terminal node.

27. A system for searching for the occurrence of text portions within a text file containing a full-text index having location information about all words in the text file, the system comprising:
 means for accepting user input indicating user-selected text portions to be searched for and user-specified conditions specifying a logical interrelation between said user-selected text portions;
 a logic unit defining a plurality of terminal nodes corresponding to said user-selected text portions, a plurality of non-terminal nodes having a logical operator term corresponding to said logical interrelation of said user-selected text portions, and a root node corresponding to portions of the text file where said user-selected text portions satisfy said user-specified conditions;
 a plurality of index lists, corresponding in number to said plurality of terminal nodes, constructed from said full-text index, each of said index lists associated with a corresponding user-selected text portion and containing a sequential listing of all occurrences of said corresponding user-selected text portion in the text file, starting at a first end of the text file, and the location in the text file of each occurrence of said corresponding user-selected text portion;
 an index pointer for each of said plurality of index lists, each of said index pointers selecting a current occurrence in each of said plurality of index lists, said index pointers initially selecting a first location in each of said plurality of index lists;
 a Boolean pointer pointing to a selected non-terminal node on said search tree;
 a Boolean evaluator applying said logical operator term at said selected non-terminal node to said current occurrence in each of said plurality of index lists for word terms at terminal nodes adjacent to said selected non-terminal node, said Boolean evaluator generating a hit indicator when said current occurrence in each of said plurality of index lists for word terms at terminal nodes adjacent to said selected non-terminal node satisfies said logical operator term at said selected non-terminal node;
 a storage index for each of said non-terminal nodes temporarily storing a list of locations within the text file for which the word terms at adjacent terminal nodes satisfy said logical operator term at each of said non-terminal nodes;
 an index selector advancing said index pointer to the next sequential occurrence for one of said index lists for which said current occurrence in the text file is at the location in the text file nearest said first end if said Boolean evaluator did not generate said hit indicator or if said logical operator term at said selected non-terminal node is an OR operator, and advancing said index pointer for one of said index lists for which the next sequential occurrence in the text file is at the location nearest said first end in the text file nearest said first end if said Boolean evaluator did generate said hit indicator;
 analysis means for determining if a non-terminal node adjacent to said selected non-terminal node has adjacent non-terminal nodes further from said root node that have not been analyzed by said Boolean evaluator; and
 a Boolean pointer selector advancing said Boolean pointer to a non-terminal node adjacent to said selected non-terminal node and selecting said adjacent non-terminal node as a new present location if said analysis means determines that said adjacent non-terminal node has no non-terminal node further from said root node that has not been analyzed by said Boolean evaluator, said Boolean pointer selector advancing said Boolean pointer to said non-terminal node further from said root node if said analysis means determines that said non-terminal node further from said root node has not been analyzed by said Boolean evaluator, whereby said Boolean evaluator evaluates all of said non-terminal nodes and provides a list of any occurrences of said user-selected text portions that satisfy said user-specified conditions interrelating said user-selected text portions.

28. The system of claim 27 wherein said index selector advances said index pointer to the next sequential occurrence in the text file for one of said index lists for which said current occurrence in the text file is at the location in the text file nearest said first end if said Boolean evaluator did generate said hit indicator if said current occurrence for each of said index lists is not identical and said next sequential occurrence for each of said index lists is identical.

29. The system of claim 27 wherein said Boolean pointer initially selects the non-terminal node furthest from said root node.

30. The system of claim 27 wherein said storage index for said selected non-terminal node discards said list of locations once said Boolean evaluator has applied the logical operator at a non-terminal node adjacent to said selected non-terminal node.

31. A system for searching a text file for the occurrence of user-selected text portions that satisfy user-specified conditions, the text file containing a full text index having information about the location of all words in the text file, the system comprising:
- a user input allowing the user to enter the user-selected text portions and the user-specified conditions;
- a logic unit defining a plurality of word terms corresponding to the user-selected text portions and a plurality of logical operator terms corresponding to the user-specified conditions that interrelate the user-selected text portions;
- a plurality of index lists constructed from the full text index, said plurality of index lists corresponding in number to said plurality of word terms and containing a sequential listing of all occurrences of said corresponding word term in the text file, starting at a first end of the text file, and indicating the location of each occurrence in the text file;
- an index pointer for each of said plurality of index lists, each of said index pointers selecting a current occurrence in each of said plurality of index lists;
- a Boolean pointer selecting one of said plurality of logical operator terms;
- an analyzer evaluating said selected logical operator term by applying said selected logical operator term to said current occurrence in each of said plurality of index lists for word terms interrelated by said selected logical operator term, said analyzer generating a hit indicator when said current occurrence in each of said plurality of index lists for word terms interrelated by said selected logical operator term satisfies said selected logical operator term;
- a storage unit associated with each of said logical operator terms for storing said current occurrence in each of said plurality of index lists for word terms interrelated by said selected logical operator term if said analyzer generates a hit indicator; and
- an index selector advancing said index pointer to the next sequential occurrence for the one of said index lists for which said current occurrence in the text file is at the location in the text file nearest said first end if said analysis means did not generate a hit indicator or if said selected logical operator term is an OR operator and advancing said index pointer to the next sequential occurrence for the one of said index lists for which said next sequential occurrence in the text file is at the location in the text file nearest said first end if said analysis means did generate a hit indicator.

32. The system of claim 31 wherein said index lists for word terms interrelated by said selected logical operator term are discarded after said analyzer analyzes said selected logical operator term using said plurality of index lists for word terms interrelated by said selected logical operator term.

33. The system of claim 31, further including a Boolean pointer selector advancing said Boolean pointer to a new selected logical operator term which has not previously been analyzed by said analyzer.

* * * * *

UNITED STATES PATENT AND TRADEMARK OFFICE
CERTIFICATE OF CORRECTION

PATENT NO. : 5,412,807
DATED : May 2, 1995
INVENTOR(S) : Bruce Moreland

It is certified that error appears in the above-indentified patent and that said Letters Patent is hereby corrected as shown below:

In column 15, claim 5, line 21, after "claim" and before "further", please insert --1--.

In column 16, claim 8, line 16, after "6" and before "further", please insert --,--.

In column 16, claim 10, line 33, after "claim" and before "further", please insert --6--.

In column 18, claim 14, line 3, after "operator" and before "and" please insert --,--.

In column 19, claim 16, line 7, please delete "art" and substitute therefor --an--.

In column 21, claim 23, line 21, please delete "aid" and substitute therefor --said--.

In column 24, claim 31, line 21, after "operator" and before "and" please insert --,--.

Signed and Sealed this

Twenty-first Day of November, 1995

*Attest:*

BRUCE LEHMAN

*Attesting Officer*  Commissioner of Patents and Trademarks